Oct. 28, 1958 A. W. GARDNER 2,857,828

COMPACTION METHOD

Filed June 19, 1950 7 Sheets-Sheet 1

INVENTOR

Adryl Wade Gardner

BY [signature]

ATTORNEYS

Oct. 28, 1958 A. W. GARDNER 2,857,828

COMPACTION METHOD

Filed June 19, 1950 7 Sheets-Sheet 2

INVENTOR
Adryl Wade Gardner

BY [signature]

ATTORNEYS

INVENTOR
Adryl Wade Gardner
BY [signature]
ATTORNEYS

Oct. 28, 1958 A. W. GARDNER 2,857,828

COMPACTION METHOD

Filed June 19, 1950 7 Sheets-Sheet 4

INVENTOR

Adryl Wade Gardner

BY

ATTORNEYS

Oct. 28, 1958 A. W. GARDNER 2,857,828

COMPACTION METHOD

Filed June 19, 1950 7 Sheets-Sheet 5

INVENTOR
Adryl Wade Gardner

BY [signature]
ATTORNEYS

Oct. 28, 1958 A. W. GARDNER 2,857,828

COMPACTION METHOD

Filed June 19, 1950 7 Sheets-Sheet 6

INVENTOR

Adryl Wade Gardner

BY

ATTORNEYS

INVENTOR

Adryl Wade Gardner

BY

ATTORNEYS

United States Patent Office 2,857,828

Patented Oct. 28, 1958

2,857,828

COMPACTION METHOD

Adryl Wade Gardner, Redlands, Calif.

Application June 19, 1950, Serial No. 168,959

3 Claims. (Cl. 94—22)

This invention is a novel method for compacting a wide variety of materials. There have been heretofore produced special rolls for the compaction of earth fills. One roll of that nature is the projecting lug type roll known as the "sheepsfoot." Other types of projecting lug rolls are the continuous projecting lug or separated ring construction shown in U. S. Letters Patent to Huntley #1,831,116, and the more recent undulating lug construction shown in U. S. Letters Patent to Greiner #2,484,285. Another true continuous ring roll is disclosed in U. S. Letters Patent to Henderson #1,190,257.

The theory of the action of projecting lug type rolls is that the projecting lugs present a reduced area at their extremities with a resulting increase in unit pressure per square inch of end area on the soil being compacted. This is obvious in the case of "sheepsfoot" lugs, while in the continuous projecting lug type of roll, such as Huntley, the high pressure area is the circumferential area of the continuous ring.

When projecting lug rolls of the "sheepsfoot" type are applied to a layer of soil, the lugs penetrate the loose material at an inclined angle. As the roll revolves in a forward direction, the lugs, projecting radially from the roll axis, are increasingly brought more nearly into vertical positions until they are finally in a true vertical position on the bottom of the roll at the vertical centerline. In this position each lug carries its maximum share of the roll weight and the soil supporting the reduced area high pressure end portion of the lug is compacted. The soil thus compacted by each lug is left essentially in the shape of a short conical or pyramidal column and is, of course, located at the bottom or lower elevation of the uncompacted soil layer. Consequently, the "sheepsfoot" roll is said to compact the soil layer from the bottom up instead of from the top down as is the case with conventional smooth or solid faced rolls.

As the "sheepsfoot" roll continues to revolve in a forward direction, the lugs are carried past and to the rear of the vertical centerline of the roll. They are thus increasingly tipped, in reverse fashion to the above described entrance cycle, while still supporting their individual shart of the roll weight. This increasingly tilted or angular position of the lug, while still loaded, creates an overturning and/or shearing force in the supporting conical or pyramidal column of soil which was compacted when the lug bore the maximum weight as it passed through the vertical position aforementioned.

This overturning and/or shearing action destroys a portion of the compacted column of soil, and leaves an admixture of fractured and/or overturned columns of consolidated soil and loose soil. Subsequent passes of the "sheepsfoot" or projecting lug type of roll encounters this admixture of different densities of like soils, and must provide sufficient unit pressures to deform the individual masses of consolidated soil and still apply or transfer pressure to the loose material.

It is known that the maximum density of soils can be achieved with a minimum of compaction effort (unit pressures) when the moisture content of the soil is at an optimum. This optimum moisture content varies however, in a specific soil, in ratio to its density. Consequently, it can be seen that the higher unit pressures required by subsequent passes of a "sheepsfoot" or lug type roll are not compatible with the lower required pressures of the initial pass of the roll when it was acting on loose material only. It is, therefore, obvious that the unit pressures necessary for this type roll are in excess of those of a roll which does not require re-working of some of the already compacted material. This can be resolved directly into inefficiency as the re-working of a portion of the compacted material requires that the unit pressures of the "sheepsfoot" or lug type roll be adjusted to the requirements of the more dense material in order to be continuously effective. This means that the roll must, of necessity, be much heavier than if it was for use on the same material in its loose or less dense state. The heavier machine would be more expensive and the required power of the propelling elements would, of course, be much greater and more expensive.

Summarizing the characteristics of the projecting lug type of roll, or its most representative species, the "sheepsfoot" roll, it may be said that the beginning of the cycle of operation, that is, its entrance into the loose layer of soil is made in an efficient and non-power consuming manner. The conclusion of the cycle, however, has a destroying effect which precludes the use of this type of roll as a finishing roll. From the foregoing functional description, we may say that the projecting lug type of roll is a "walking roll," and that a "walking roll" is not a finishing roll. Referring to the smooth or solid faced roll, above mentioned, conventional finishing rollers have, without exception, been of this type. It is unquestionably apparent that a smooth or solid faced roll cannot penetrate the soil, it cannot reach the bottom portions or lower elevations of the soil layer, and thus exert its maximum pressures and achieve the resultant maximum densities in that area. Consequently, the smooth faced roll cannot uniformly consolidate as thick a layer of soil as can the projecting lug type of roll. The latter, however, as before stated, cannot secure compaction to a finished surface, for the reasons given, whereas the smooth faced roll leaves a smooth surface, compacted at the top, in contrast to the uncompacted and/or perforated and indented surface left by the projecting lug type of roll. The lug type roll, however achieves a uniform density in all elevations of the compacted soil layer. It is also clearly obvious that the projecting lug type roll cannot be singly used in compacting bituminous materials such as asphaltic concrete.

In further reference to the smooth faced roll, it is known that a portion of the loose material being rolled is pushed ahead of the roll in the form of a wedge shaped wave of flowing material. This material is displaced in a forward direction and cannot escape the roll unless the flowing material encounters a surface depression or escapes around the ends of the roll. This displaced material, in some cases, builds up until it acts as a serious block, retarding the roll by increasing its rolling resistance and requiring additional power or drawbar pull. Very frequently, in soils and the like, the machine is stalled by this resistance.

The drawbar forces overcoming the resistance offered by the displaced material to the forward travel of the smooth faced roll, causes the smooth faced roll to climb the flowing wedge-shaped wave of displaced material. Consequently the smooth faced roll is inclined to surmount the displaced material and leave no unprocessed material behind the vertical centerline of the roll. It can be readily seen that the smooth faced roll is a "climbing roll" and that a "climbing roll" is a finishing roll.

Since the smooth faced roll is a finishing roll, it must be recognized that it is applicable to paving materials as well as soils. In this consideration it is therefore necessary to recognize that the forward pressure of the smooth faced roll against the displaced material also causes longitudinal or horizontal shear, known as laminations, in the material being rolled. In most materials, especially those of the bituminous type, these laminated layers of material seldom bond satisfactorily to the underlying layer in subsequent rolling. These laminated unbonded layers seriously affect the stability of the material as the laminations permit moisture to enter the minute crevices and assist in the early deterioration of the material, as well as causing a higher roughness index of the finished pavement.

In addition to the forward displacement caused by a smooth faced roll, there is also a tendency for displacement of the material along the longitudinal axis of the roll. The material moving in this direction cannot easily escape, even in soils, unless it passes the ends of the roll. Displacement in either a forward or longitudinal direction disturbs the uniform thickness to which the material was originally placed and has a tendency to leave the compacted material with areas of greater or less depth than specification may require.

The foregoing discussion of projecting lug and smooth faced rolls is important when considering my novel compaction method, because the latter presents an entirely new and successful approach to the problem of achieving uniform and complete compaction. All of the advantages obtained by the use of both the projecting lug type and the smooth faced type of rolls are obtained by the use of the "segmented" type roll to perform the present method, which roll when so used overcomes the disadvantages of the projecting lug and smooth faced types of rolls.

My novel compaction method will compact materials uniformly from the bottom or lower elevation to the finished surface or top elevation of the materials to be compacted. Furthermore, the work is accomplished uniformly and without damaging effect through the compacted materials and the finished surface is equivalent to the results obtained by the conventional smooth face type roller.

It is also important to note that my "segmented" roll in conjunction with and followed by a smooth faced roll, as will be described later, also produces an equivalent result to that obtained by the use of segmented rolls only.

I will explain the invention with reference to the accompanying drawings, which illustrate several practical embodiments thereof, to enable others familiar with the art to adopt and use the same, and will summarize in the claims the novel steps of my method.

In said drawings:

Figure 3 also showing a complete roll construction including the hub, axle, bearings, spokes and rings; also showing the supporting or carrying means in the conventional yoke.

Figure 3:
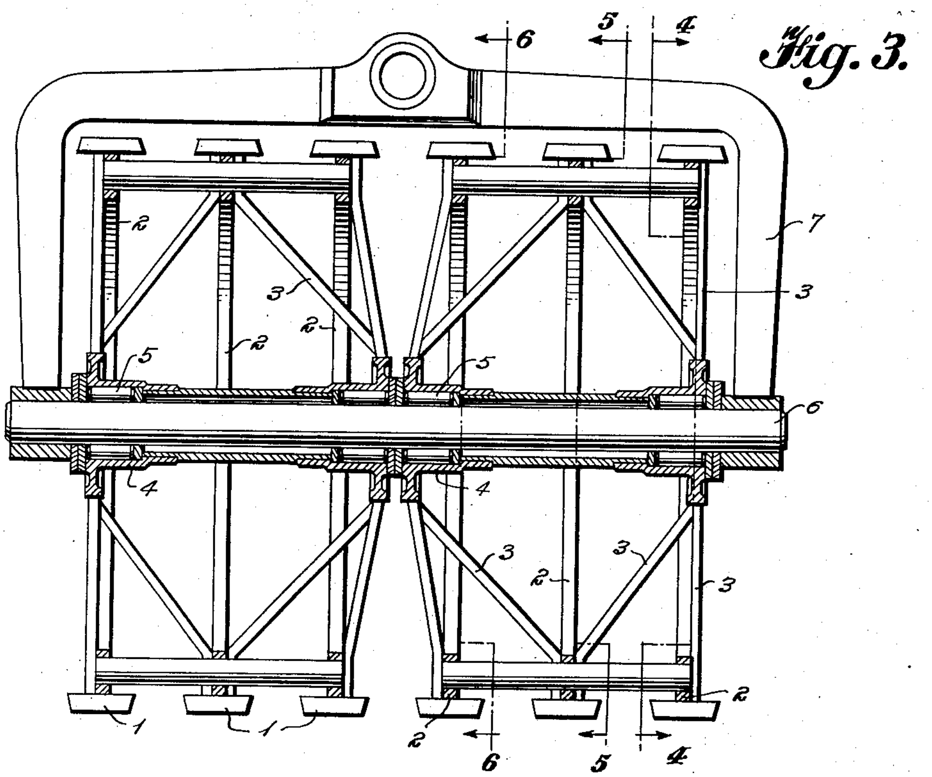
Fig. 3 is a longitudinal section incorporating the conventional "split" or double roll construction to facilitate steering.
Figures 4, 5, 6:
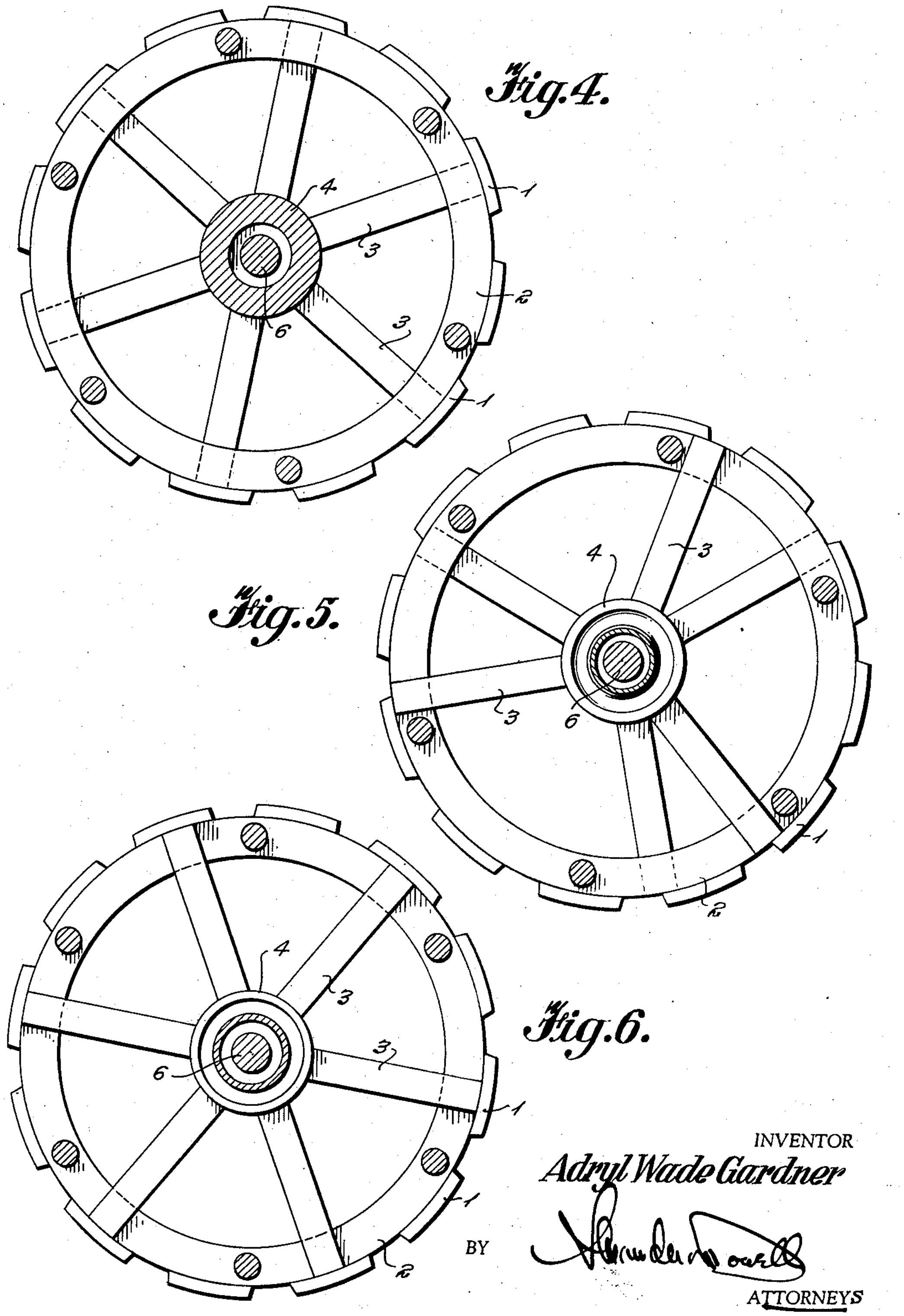

Figs. 4, 5 and 6 are sectional views at points indicated by the lines 4—4, 5—5 and 6—6, Figure 3.

Figure 7:
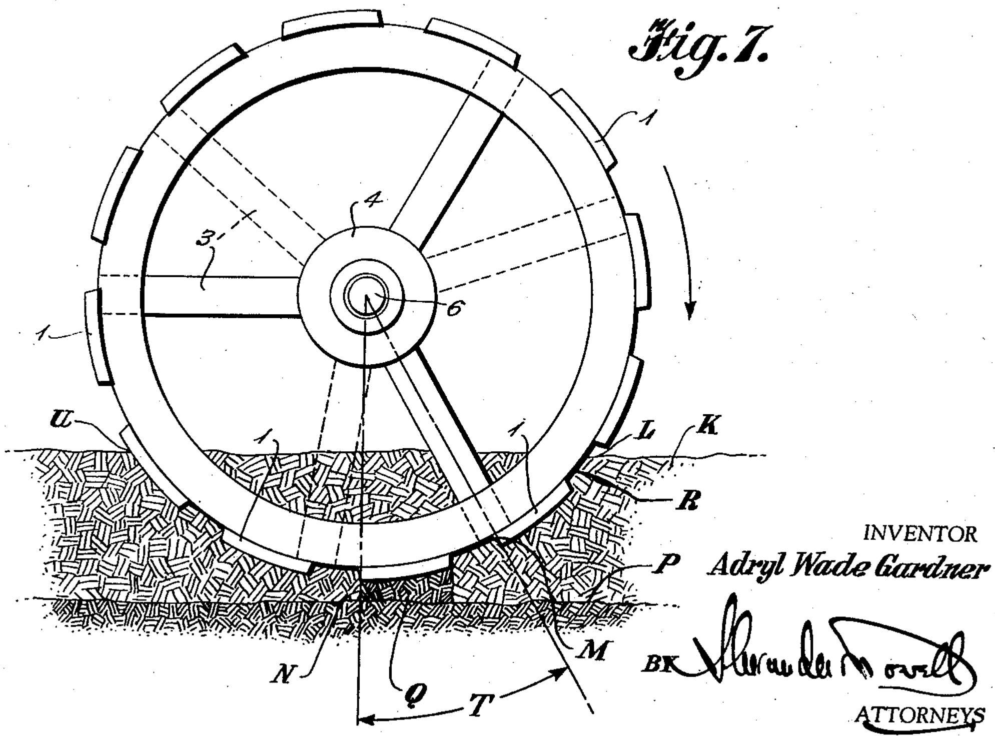
Figure 7A:
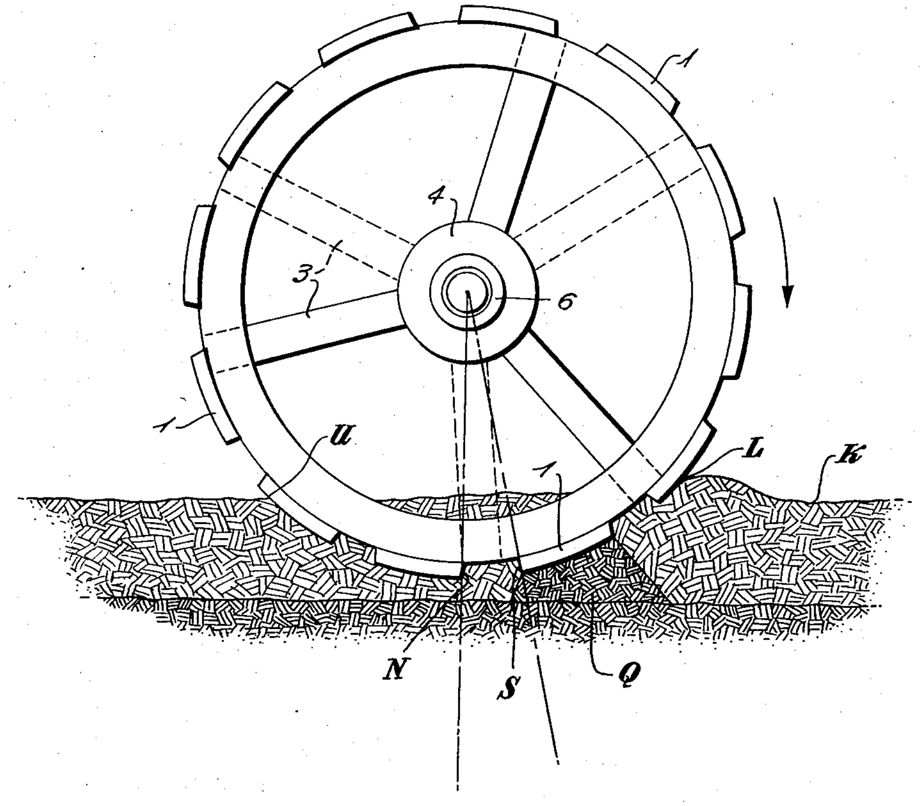

Figs. 7 and 7*a* are sectional views, corresponding to Figs. 4, 5 and 6, but illustrating the entrance, compaction and exit cycles of the segmented roll in a layer of material to be compacted.

Figure 2:
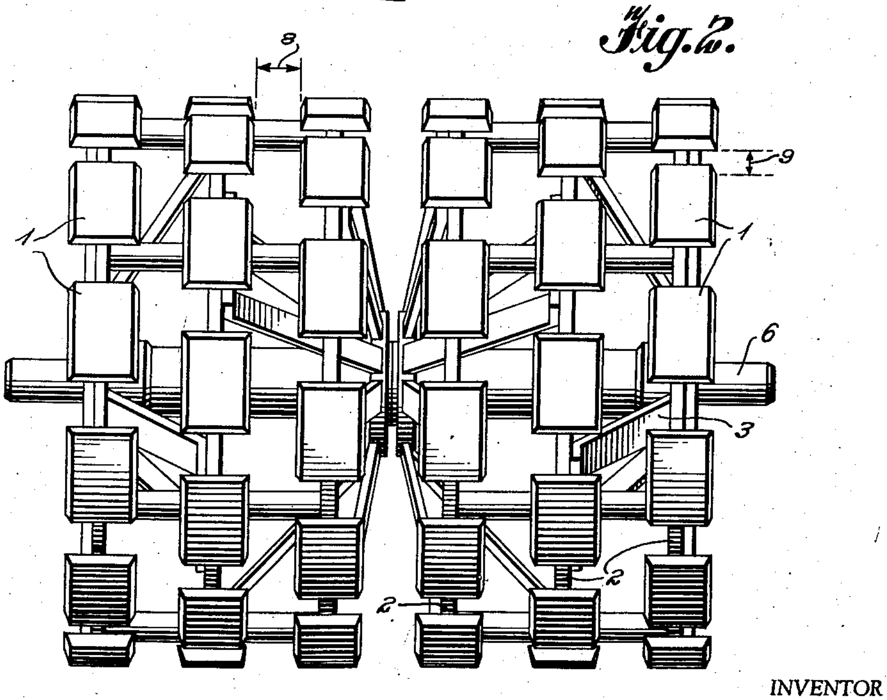
Fig. 2 is a front view of the roll shown in Fig. 1.
Figure 8:
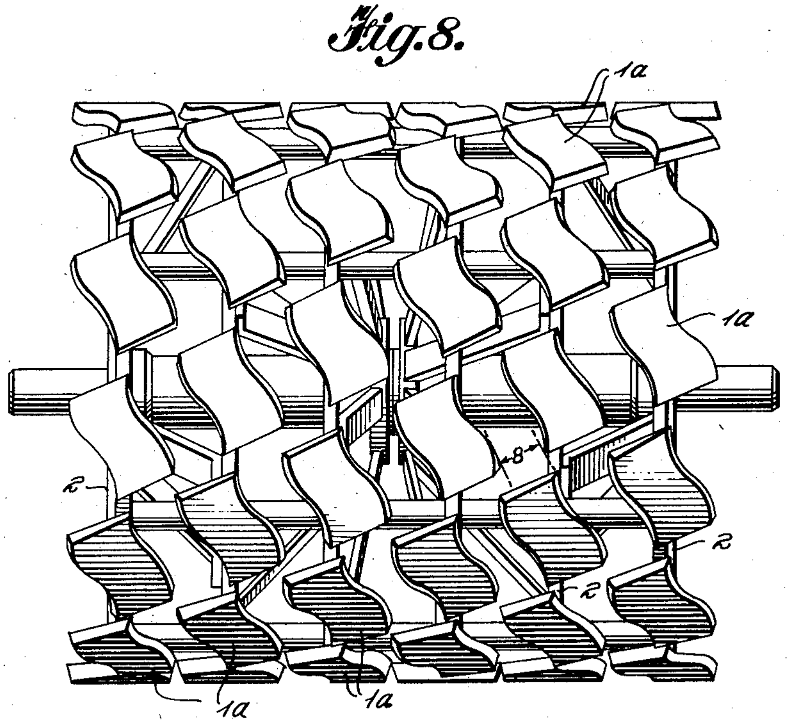

Fig. 8 is a front view corresponding to Fig. 2 but showing longitudinally offset segmented pads.

Figure 9:
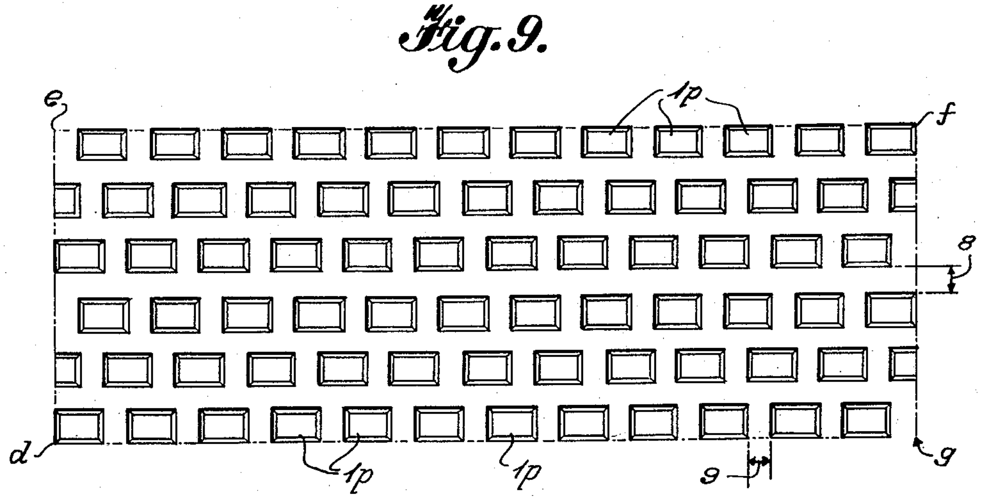

Fig. 9 shows a ground pattern left by the effects of the pads on the roll arranged as shown in Fig. 2 after one complete revolution of the roll.

Figure 10:
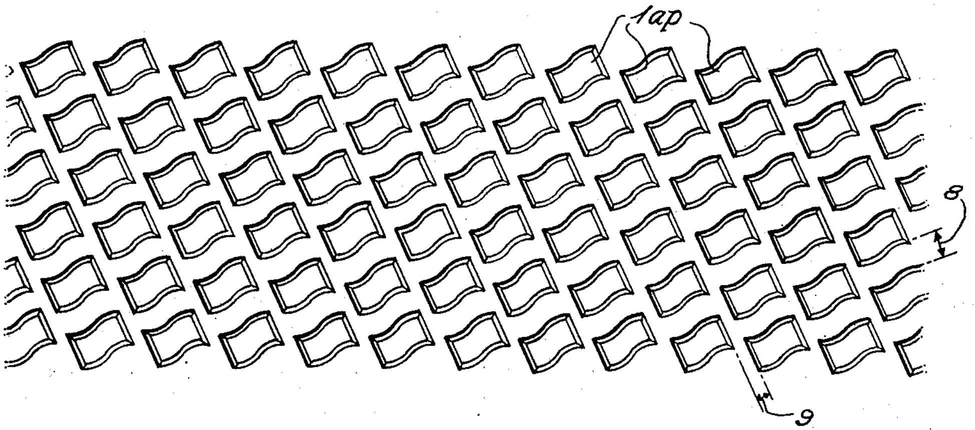

Fig. 10 shows the corresponding ground pattern of the pads on the roll arranged as shown in Fig. 8.

Figure 11:
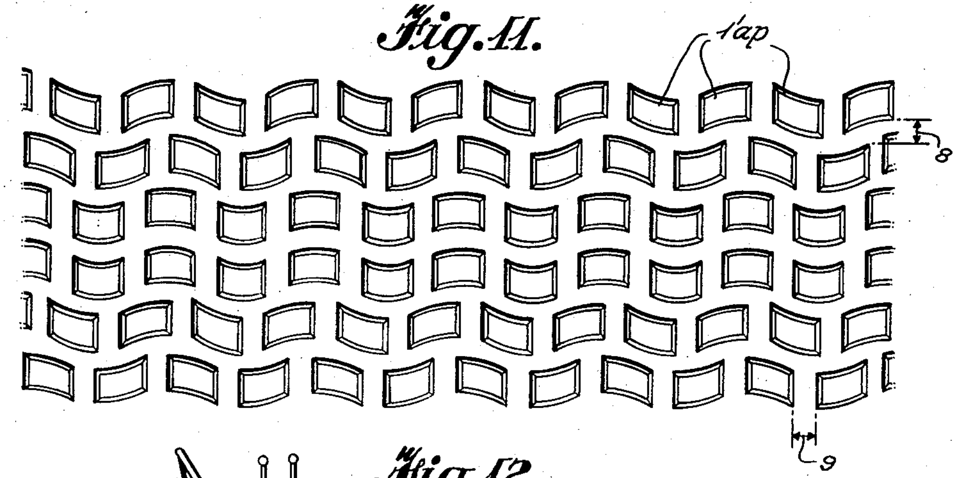

Fig. 11 shows a ground pattern of another arrangement of offset pads, such as shown in Fig. 8, wherein the pads are offset in alternatively opposite directions.

Figure 12:
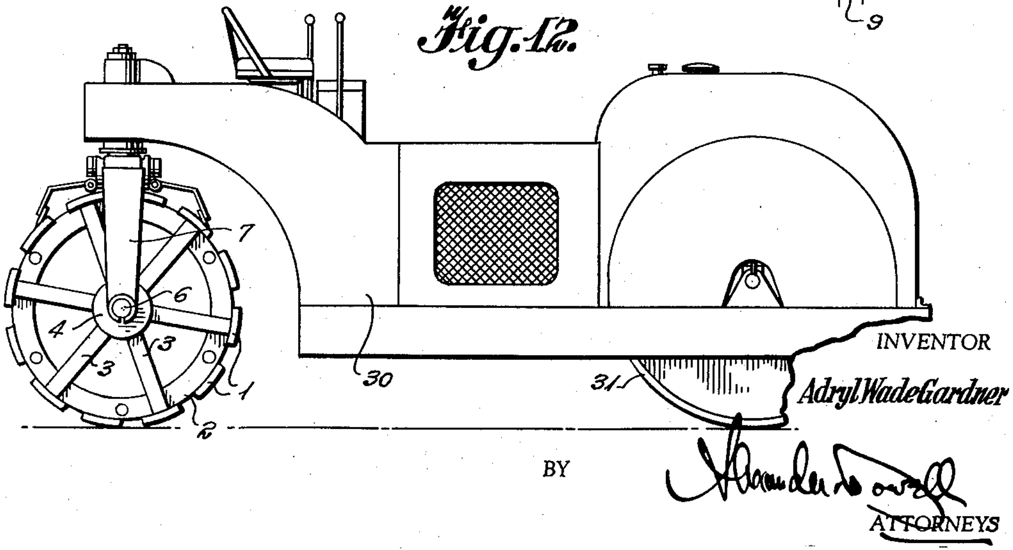

Fig. 12 is a side view of a conventional tandem roller in which the segmented rolls are used as guide rolls, the drive roll remaining in its conventional smooth faced form.

Figures 13, 14, 15:
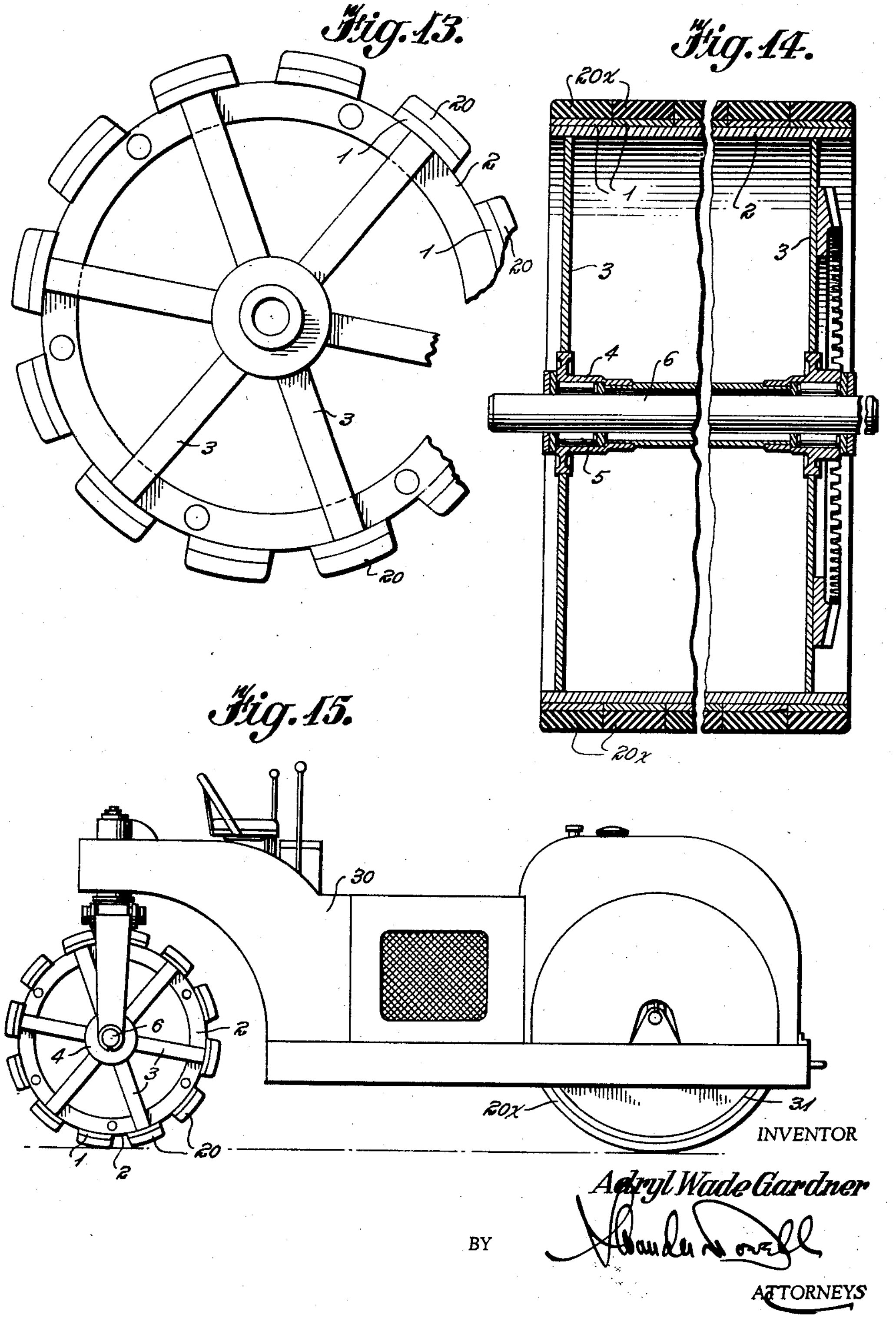

Fig. 13 is a side view through a segmented roll, similar to those shown in Figs. 4, 5 and 6 except that rubber pads have been attached or molded to said regular pads.

Fig. 14 is a sectional view through a smooth faced roll such as shown in Fig. 12 showing a series of rubber tires thereon forming a continuous smooth face.

Fig. 15 is a side view of a conventional roller showing the rubber faced rolls of Figs. 13 and 14 applied to the rolls of a tandem roller.

Figure 1:
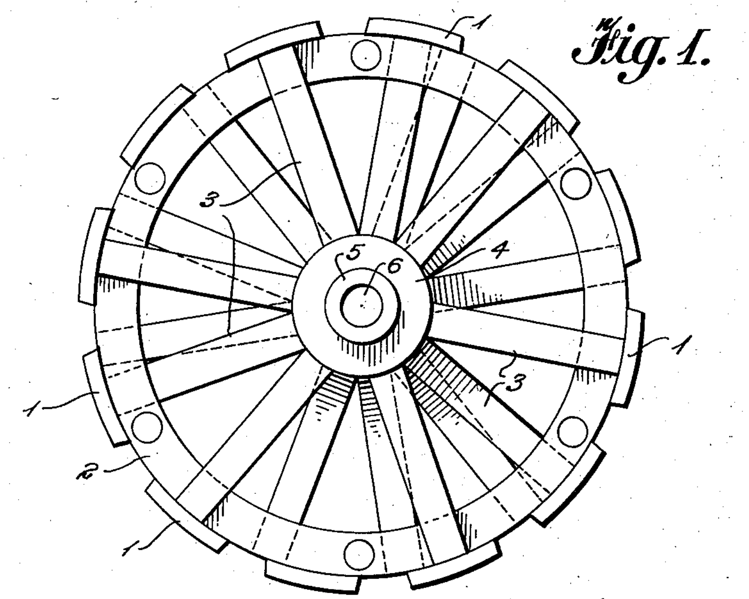
Figure 1 is an end view of a segmented roll assembly, showing the segmented pad arrangement.

In the drawings, the roll pads 1 (Fig. 1) and variation of pads 1*a* (Fig. 8) are carried by circular rings 2 (Fig. 3). These rings 2 are in turn supported by spokes 3 radiating from hubs 4. Hubs 4 are journaled in bearings 5 carried by axle 6. In case of a steerable roll, axle 6 is supported by steering yoke 7 (Fig. 3) in the conventional manner.

It will be noted from the ground patterns illustrated in Figs. 9, 10 and 11 that the total area of the pads 1*a* of the segmented rim, or as represented by the total area of all of the depressions 1*p* or 1*ap* provides a residual ground pattern well adapted for subsequent rolling by a subsequent roll of either the segmented or smooth face type.

It will also be noted that one revolution of the roll leaves a pattern of compacted and uncompacted material, the compacted areas being represented by outlines 1*p*, 1*ap* and 1'*ap* (Figs. 9, 10 and 11) and the uncompacted material being represented by the spaces between depressions 8 and 9.

Describing the action of the segmented roll, in the original passes the pads 1, 1*a* (Figs. 2 and 8) enter the layer of loose material, penetrating in coultering fashion the top elevation K (Figs. 7 and 7*a*) of the material layer. This coultering action continues until the leading edge or end of the pad 1, 1*a* has progressed from point L to approximately point S (Fig. 7*a*). During this coultering cycle spaces 8 (Figs. 2 and 8) permit the loose material to flow around and surmount the pads 1, 1*a*, this being true in soils and the like, where deep layers of lose material are compacted. In bituminous materials, of course, the material is spread in much thinner layers and it would not literally surmount the pads and flow through the open roll as does the loose material. The spaces 8 and 9 between pads 1, 1*a*, however, would function as escape areas for the material. Because of this coultering action, the pads penetrate to point S (Fig. 7*a*) without causing sufficient mass displacement to push excessive quantities of material ahead in the form of a wave as would be the case when using smooth faced rolls. When the leading end of the pads arrive at approximately point S, they exert the maximum downward pressure on the underlying loose or uncompacted material, and the maximum compaction effort is achieved and the compaction cycle is begun. When the leading edge of a pad reaches point N (Fig. 7), the maximum compaction of the material underlying that point is achieved. When the trailing end of the pads arrive at point N the entire supporting column of underlying material is uniformly compacted and the compaction cycle is terminated, the compaction being thus completed in advance of the vertical plane through the axis of the roll. As the pad progressively passes point N, it rises, same as the continuous rim of a smooth faced roll, and pressure is thus relieved from all portions of the pad which has passed this point. Thus, the exit cycle from N to U begins. The exit cycle is made without disturbance to the material compacted in preceding compaction cycles and is in reverse manner to the coultering entrance cycle from points L to S. It should be especially noted that there is a complete absence of the shearing and/or overturning action of the projecting lug type of rolls hereinbefore referred to.

Referring again to the compaction cycle, the full pressure of the pads 1, 1*a* is applied to the underlying material supporting the pads in this area. The material which comes under spaces 8 and 9 is not put under load by the segmented roll and thus does not bolster or confine the loaded material underlying the pads. In the case of a smooth faced roll, all materials underlying the roll contact are loaded, and thus have temporary added stability due to this fact. The material to which the pads of the segmented roll apply pressure is thus relatively free and unobstructed to move and adjust in order to settle into a more dense mass capble of supporting the applied load. Material thus displaced need move only a minimum distance, never in excess of one half the width or length of a pad, until it can find escape from the action of the pads. Consequently, any tendency for excessive masses of displaced material to build up, push and flow ahead, or in a longitudinal direction, is overcome. This escape action, vital in the compaction cycle, is also of great importance in the entrance cycle hereinbefore described. From the foregoing, it is clear that the segmented roll functions as a "walking" roll, same as a projecting lug roll in that it compacts from the bottom up in a soil layer.

Referring again to the compaction cycle of the segmented roll, it will be noted that a fully compacted block or "brick" of material Q, in Fig. 7, is left by each pad 1, 1*a*. These blocks or columns of compacted material are of a stable shape and form in contrast to the unstable pyramidal or columnar shaped compacted material left by the projecting lug type of roll. Their shape affords good support, and beginning at the lower elevations of the soil layer, they are progressively formed, by each subsequent pass of the segmented roll, until the entire soil layer consists of a built-up mass of uniformly compacted material. The material left uncompacted by spaces 8 and 9 in the segmented roll, between the columns of compacted material Q in each individual pass of the roll, is compacted by subsequent passes of the roll. Thus the shape of compacted portions left by the roll on subsequent passes may not duplicate the exact shape of those left by previous passes, but may have projecting areas to accommodate the aforementioned uncompacted spaces left by the previous pass of the segmented roll. Repeated passes of the segmented roll, as before mentioned, eventually compact the entire layer of material, in a uniform manner, and the top surface is as smooth as that left by a smooth faced roll. It is therefore clear that the segmented roll can also function as a "finishing" roll and is a "climbing" roll.

The aforementioned progressive consolidation of the entire soil layer results in a further important advantage afforded by the use of the segmented roll, as compared to either a sheepsfoot or smooth faced roll, in that moisture is conserved and is constantly available for proper utilization as required throughout the processing of the entire soil layer.

In the action of the sheepsfoot roll, in the compaction cycle, moisture worked out of that portion of the soil being compacted or processed condenses on its surface and is "blotted" or absorbed by the surrounding loose or uncompacted material. This surplus moisture from the compacted material, in combination with the original moisture in the uncompacted material, is subsequently partially evaporated by aeration in the disturbance caused by subsequent passes of the sheepsfoot roll. It is necessary, in many operations using sheepsfoot rollers, to add water to bring the moisture content back up to optimum for compacting or curing certain types of established material.

The action of the smooth faced roll does not compact uniformly from the lower elevation to the surface and the principle of compaction from the top or finished surface downward does not give the moisture in the material at the lower elevations an opportunity to escape and be retained on the surface. This is a contributing factor in securing less densities at a lower elevation with a smooth faced roll.

In comparison and contrast to the foregoing, the action of the segmented roll also progressively works and presses out the excess moisture as the bricks or blocks of material are compacted. This moisture is also condensed on the surface of the compacted material. The moisture extruded by compaction of each subsequent block or brick combines with that from previous passes and is brought to the surface of the compacted soil layer where normal evaporation takes place.

The aforementioned extra expense of adding water to bring the moisture content back to the optimum is thus avoided. Also, the excess moisture is constantly available for proper absorption, and utilization in the remaining uncompacted soil, if needed, and is eventually available at the surface for curing if required.

In further reference to the exit cycle of the pads 1, 1*a*, it was hereinbefore mentioned that pressure is relieved from all portions of the pad which have passed point N (Fig. 7). Consequently there is no disturbing, overturning or destroying action or effect on the compacted brick Q of compacted soil. Since irregular, broken and/or overturned columns of compacted soil or material in an admixture with loose soil is not created by the segmented roll, it is not required that any of the material previously compacted be reworked by subsequent passes of the roll. Consequently the pressure required when using the segmented roll need be great enough only to suit the requirements of the uncompacted material.

It was hereinbefore mentioned that the segmented roll has a further advantageous characteristic in that it can be used in conjunction with a smooth faced roll, as in Figs. 12 and 15, achieving, in all materials, the advantageous results of both the projecting lug and smooth faced rolls but without the objectionable effects of either. It has been shown that repeated passes of the segmented roll alone will uniformly and thoroughly compact the entire layer of material, leaving the compacted top surfaces as smooth as that left by a smooth faced roll. It is obvious that the "waffle" like ground pattern left by the original pass of the segmented roll will facilitate compaction if encountered by a smooth faced roll. The raised pattern of the escaped or uncompacted material left by a preceding pass of the segmented roll is encountered by the smooth faced roll, the raised pattern of uncompacted material contacted by the roll is compacted to a density equivalent to the density of the material previously compacted by the segmented roll, as represented by the depressed portion of the pattern. Material displaced by the smooth faced roll escapes into the depressions formed by the compaction cycle of the preceding segmented roll, thus avoiding the building up of a mass of displaced material ahead of the smooth faced roll. Subsequent passes of the rolls repeat this action until the entire layer is uniformly compacted. It is, therefore, clear that the segmented roll used in conjunction with and followed by a smooth faced roll, will result in essentially the same rate and degree of compaction as if two or more segmented rolls were used in tandem or by repeated passes of a segmented roll.

In Fig. 12 the frame 30 of a conventional tandem type road roller is shown, same having a drive roll 31 at its rear end, the segmented roll, with pads 1, being shown as the steering roll. The drive roll 31 may be driven by any conventional prime mover (not shown) carried by the frame 30. In Figs. 13, 14, 15, the pads 1 are covered by rubber facings 20, while the drive roll 31 is covered by a rubber facing 20*x*.

The following is a brief summary of the merits of the performance of the segmented type roll as compared to the results obtainable when using either the projecting lug type or smooth faced type of roll. The segmented roll penetrates to the lower elevation of the material being compacted, as does a projecting lug roll, thus compacting the layer from the bottom up, and achieves uniform density. It does not, however, destroy a portion of the compacted material in the exit cycle, as does the projecting lug type roll, and it can therefor compact uniformly the entire depth of the layer of material being compacted. The entrance cycle is therefore similar to the entrance cycle of the projecting lug type roll. The compaction cycle is similar to the compaction cycle of a smooth faced roll. The exit cycle is also the same as the smooth faced roll. It may be said, therefore, that the segmented roll retains only the beneficial action of both the segmented and smooth faced types of rolls, and eliminates entirely the undesirable action of the two.

The segmented roll, as supported by actual tests, demonstrates an entirely new theory of the mechanics of compaction and thus a new method of compaction. It is novel in operation, and consequently, much discussion of the detailed construction of the segmented roll and/or its carrying vehicle has been avoided. The limited explanation, therefore, of the machines of Figs. 12 and 15 is given merely to show it in a self-propelled vehicle. In Fig. 12, for example, both rolls might be of the segmented type if desired, although the combination as shown is an important combination. It is believed that the segmented roll will be extensively used both in conjunction with a smooth faced roll as well as in a machine using only the segmented rolls. It will also used in drawn vehicles as well as in self-propelled types.

I will summarize my novel method in the following claims, wherein I claim:

1. The method of compacting material within a plot including the step of compacting in the plot a pattern of discrete areas arranged in spaced parallel rows, the areas of each row being staggered with respect to the areas of adjacent rows, the width of said areas being at least as great as the spacing between rows and the length of said areas being at least as great as the gaps between successive areas in a row, the step of uniformly rolling the plot, and then compacting in the plot a similar pattern of discrete areas offset from the first mentioned pattern.

2. The method of compacting material within a plot including the step of applying to said material a pattern of compaction forces moving in a frontal line along spaced parallel courses, each course being at least as wide as the spacing between courses and each course being interrupted at intervals to permit bypassing of loose material being pushed along the course ahead of the frontal line, the interruptions of adjacent courses being staggered so that each interruption lies opposite compacted areas in adjacent courses, the step of uniformly rolling the plot, and then applying to the material in the plot a similar pattern of compaction forces offset from the first mentioned pattern.

3. The method of compacting material within a plot including the step of applying to said material a pattern of compaction forces moving in a frontal line along spaced parallel courses, each course being at least as wide as the spacing between courses and each course being interrupted at intervals to permit bypassing of loose material being pushed along the course ahead of the frontal line, the interruptions of the respective courses being staggered so that said application of compaction forces continues in at least one course at all times during the movement through said plot, the step of uniformly rolling the plot, and then applying to the material in the plot a similar compaction pattern offset from the first mentioned pattern.

References Cited in the file of this patent

UNITED STATES PATENTS

| | | |
|---|---|---|
| 243,463 | Schaefer | June 28, 1881 |
| 1,432,984 | Eburne | Oct. 24, 1922 |
| 1,673,184 | Cady | June 12, 1928 |
| 1,693,903 | Johnston | Dec. 4, 1928 |
| 1,718,863 | MacKenzie | June 25, 1929 |
| 1,764,963 | Laster | June 17, 1930 |
| 2,410,465 | Small | Nov. 5, 1946 |
| 2,484,285 | Greiner | Oct. 11, 1949 |

FOREIGN PATENTS

| | | |
|---|---|---|
| 715,670 | Germany | Jan. 5, 1942 |
| 544,295 | Great Britain | Apr. 7, 1942 |